(12) United States Patent
Yoon et al.

(10) Patent No.: US 9,039,269 B2
(45) Date of Patent: May 26, 2015

(54) LIGHT GUIDE PLATE AND BACKLIGHT ASSEMBLY INCLUDING THE SAME

(75) Inventors: Byung-Seo Yoon, Incheon (KR); Ju-Young Yoon, Seoul (KR); Han-Moe Cha, Anyang-si (KR); Sang-Il Park, Seoul (KR); Hee-Kwang Song, Suwon-si (KR); Jung-Kyun Kim, Seoul (KR); Su-Chang Ryu, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 320 days.

(21) Appl. No.: 13/354,395

(22) Filed: Jan. 20, 2012

(65) Prior Publication Data

US 2013/0021821 A1    Jan. 24, 2013

(30) Foreign Application Priority Data

Jul. 21, 2011    (KR) .................. 10-2011-0072543

(51) Int. Cl.
*F21V 7/04*    (2006.01)
*G02F 1/1335*    (2006.01)
*F21V 8/00*    (2006.01)

(52) U.S. Cl.
CPC ............ *G02F 1/1336* (2013.01); *G02F 1/1335* (2013.01); *G02F 1/133609* (2013.01); *G02B 6/002* (2013.01); *G02B 6/0023* (2013.01); *G02B 6/0068* (2013.01); *G02B 6/0073* (2013.01); *G02F 1/133603* (2013.01); *G02F 1/133611* (2013.01); *G02F 1/133615* (2013.01)

(58) Field of Classification Search
USPC .......................................... 362/612, 621, 608
See application file for complete search history.

(56) References Cited

U.S. PATENT DOCUMENTS

| 7,784,989 B2 * | 8/2010 | Shin ............................ 362/628 |
| 2002/0172039 A1 | 11/2002 | Inditsky |
| 2003/0147257 A1 * | 8/2003 | Lee ............................. 362/561 |
| 2006/0038196 A1 | 2/2006 | Chin et al. |
| 2006/0050532 A1 * | 3/2006 | Stadtwald-Klenke ........ 362/612 |
| 2006/0104091 A1 * | 5/2006 | Chen et al. ................... 362/621 |
| 2006/0221636 A1 * | 10/2006 | Ohashi et al. ................ 362/612 |
| 2007/0086179 A1 | 4/2007 | Chen et al. |
| 2008/0259642 A1 | 10/2008 | Parker |
| 2009/0323334 A1 * | 12/2009 | Roberts et al. ............... 362/247 |
| 2010/0290253 A1 * | 11/2010 | Tsai ............................. 362/630 |

FOREIGN PATENT DOCUMENTS

| JP | 2008034223 A | 2/2008 |
| JP | 2008053239 A | 3/2008 |
| KR | 1020060095345 A | 8/2006 |
| KR | 1020080013182 A | 2/2008 |
| KR | 1020080078224 A | 8/2008 |
| KR | 1020080097515 A | 11/2008 |
| KR | 1020090053629 A | 5/2009 |
| KR | 1020100030878 A | 3/2010 |
| KR | 1020120087400 A | 8/2012 |

OTHER PUBLICATIONS

The Extended European Search Report for European Patent Application No. 12153998.5 mailing date of Jun. 17, 2014.

* cited by examiner

*Primary Examiner* — Sean Gramling
(74) *Attorney, Agent, or Firm* — Cantor Colburn LLP (57) ABSTRACT

A backlight assembly includes a first light source unit including n light emitting members; and a light guide plate including a first side adjacent to the first light source unit, and a first groove adjacent to a first end of the first side.

15 Claims, 8 Drawing Sheets

LIGHT GUIDE PLATE AND BACKLIGHT ASSEMBLY INCLUDING THE SAME

This application claims priority to Korean Patent Application No. 10-2011-0072543 filed on Jul. 21, 2011, and all the benefits accruing therefrom under 35 U.S.C. §119, the entire contents of which are incorporated herein by reference.

BACKGROUND OF THE INVENTION (a) Field of the Invention

The invention relates to a light guide plate and a backlight assembly including the same, and more particularly, to a light guide plate and a backlight assembly including the same that can prevent color irregularity from occurring at a corner portion of a liquid crystal panel and prevent luminance imbalance between left and right sides of the liquid crystal panel.

(b) Description of the Related Art

A computer monitor, a television, a mobile phone or the like that are widely used needs a display device. Examples of the display device are a cathode ray tube display device, a liquid crystal display, and a plasma display device.

A liquid crystal display, which is one of the most common types of flat panel displays in use, includes two sheets of display panels on which field generating electrodes such as a pixel electrode and a common electrode are formed, and a liquid crystal layer interposed therebetween. The liquid crystal display displays an image by applying voltage to the field generating electrodes to generate an electric field on the liquid crystal layer, thereby determining orientations of liquid crystal molecules of the liquid crystal layer and controlling the polarization of incident light.

Since the liquid crystal display is not a self-luminous device, a light source is needed. In this case, the light source may be a separately mounted artificial light source or natural light. In the case of the artificial light source, a light guide plate ("LGP") is required in order for emitted light to reach the entire display panel at uniform luminance, Examples of the artificial light source used in the liquid crystal display are a light emitting diode ("LED"), a cold cathode fluorescent lamp ("CCFL"), and an external electrode fluorescent lamp ("EEFL").

Among them, the LED has many merits such as a long lifespan, a small size, and low power consumption as compared with other light sources, and therefore the LED is most widely used recently. In the case where the LED is used as a light source, white light can be incident to a liquid crystal panel by mixing red, green and blue diodes.

In this case, since the red diode has a relatively shorter lifespan than the green and blue diodes, a color controller is needed to control intensities of the red, green and blue diodes differently.

In addition, in the case where the white light is generated by mixing different colors of LEDs, color irregularity is caused according to the color of a diode disposed at an end of a light source in a corner portion of the liquid crystal panel.

Further, because the different colors of LEDs influence luminance in different degrees, when the different colors of LEDs are disposed at both ends of the light source, a problem of luminance imbalance of left and right sides of the liquid crystal panel is caused.

BRIEF SUMMARY OF THE INVENTION

The invention has been made in an effort to provide a light guide plate and a backlight assembly including the same that can prevent color irregularity from occurring according to a layout of a light source disposed at a corner portion of a liquid crystal panel when different colors of light emitting diodes ("LEDs") are mixed and used as a light source.

Further, the invention has been made in an effort to provide a backlight assembly that can prevent luminance imbalance between left and right sides of a liquid crystal panel.

In addition, the invention has been made in an effort to provide a backlight assembly in which white light can be stably emitted by mixing different colors of LEDs without using a color controller.

An exemplary embodiment of the invention provides a backlight assembly including: a first light source unit including n light emitting members; and a light guide plate of which a first side is adjacent to the first light source unit, in which the light guide plate includes a first groove adjacent to a first end of the first side.

The n light emitting members are spaced apart from each other and are linearly aligned, and include a first light emitting member positioned at a first end of the first light source unit; a second light emitting member positioned adjacent to the first light emitting member; a n-th light emitting member positioned at a second end opposite to the first end of the first light source unit; and a n-1-th light emitting member positioned adjacent to the n-th light emitting member. The first groove of the light guide plate may face the first light emitting member.

The first groove may have an arc shape in a plan view.

A starting point of the first groove may be positioned between the first light emitting member and the second light emitting member.

The first groove may have a shape in which a distance from the first light source unit gradually increases from the starting point of the first groove toward a position where the first groove faces the first light emitting member.

A distance from the first light emitting member to the first groove, which is measured perpendicular to the first light emitting member, is set so that the light intensity incident to the light guide plate from the first light emitting member is about 45% to about 55% of the light intensity incident to the light guide plate from the second light emitting member.

When a distance from the second light emitting member to the light guide plate, which is measured perpendicular to the second light emitting member, is between about 0.5 millimeter (mm) and about 0.7 mm, the distance from the first light emitting member to the first groove, which is measured perpendicular to the first light emitting member, may be between about 2 mm and about 4 mm.

The light guide plate may further include a second groove adjacent to a second end opposite to the first end of the first side of the light guide plate, and the second groove may face the n-th light emitting member.

The backlight assembly may further include a second light source unit positioned adjacent to a second side facing the first side of the light guide plate. The light guide plate may further include a third groove and a fourth groove adjacent to a first end of the second side, and a second end opposite to the first end of the second side, respectively.

The n light emitting members further include magenta LEDs and green LEDs which alternate with each other. The first light emitting member may be a magenta LED, and the n-th light emitting member may be a green LED.

The n light emitting members further include magenta LEDs and green LEDs which alternate with each other. The first light emitting member and the n-th light emitting member may be a magenta LED.

The magenta LED may include a blue light emitting diode chip; and a red phosphor.

Another exemplary embodiment of the invention provides a light guide plate, including: a first groove adjacent to a first end of a first side; and a second groove adjacent to a second end opposite to the first end of the first side.

The first groove and the second groove may have an arc shape. Depths of the first groove and the second groove may be between about 2 mm and about 4 mm.

The light guide plate may further include a third groove adjacent to a first end of a second side which faces the first side of the light guide plate, and a fourth groove adjacent to a second end opposite to the first end of the second side.

The exemplary embodiments of the light guide plate and the backlight assembly including the same according to the invention have the following effects.

The invention has an effect to prevent color irregularity from occurring at a corner portion of a liquid crystal panel by forming the groove on the light guide plate so that only approximately 50% of light emitted from the LED disposed at an end of the light source may be incident to the light guide plate.

Further, the invention has another effect to prevent luminance imbalance of left and right sides of the liquid crystal panel and minimize luminance deterioration by disposing the magenta LEDs at both ends when the LEDs are arranged in a line and used as a light source.

In addition, the invention has another effect to reduce a cost by alternately arranging the magenta LEDs including a blue light emitting diode chip and red phosphors and the green LEDs, and using the LEDs as a light source so that white light can be stably emitted even without using a color controller.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

A backlight assembly according to the invention will be described with reference to the accompanying drawings.

Figure 1:
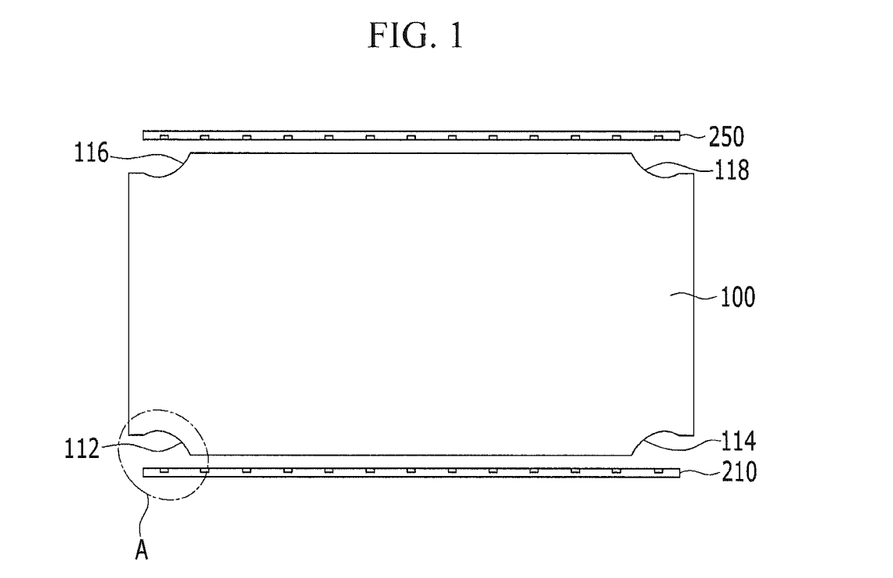
FIG. 1 is a top plan view showing an exemplary embodiment of a backlight assembly according to the invention.
Figure 2:
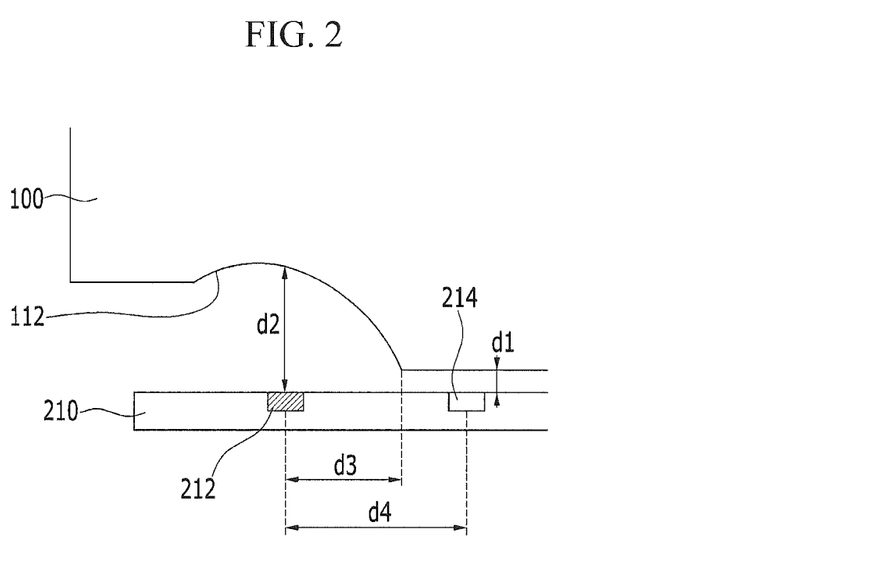
FIG. 2 is an enlarged top plan view of portion A shown in FIG. 1.
Figure 3:
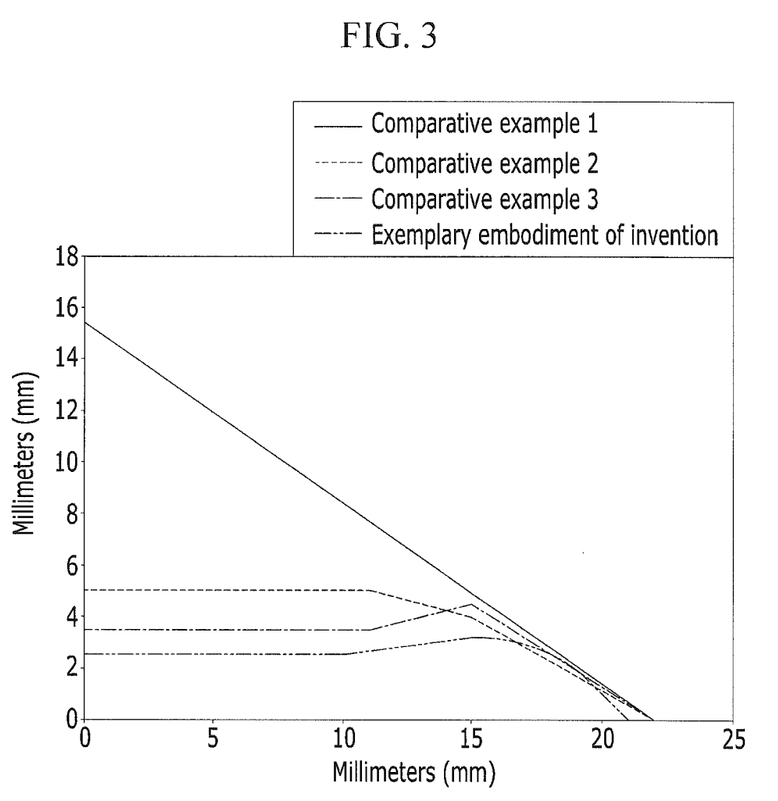
FIG. 3 is a diagram showing a top plan view of a corner portion of a light guide plate of a backlight assembly according to the invention together with top plan views of corner portions of light guide plates of Comparative Examples.
Figure 4:
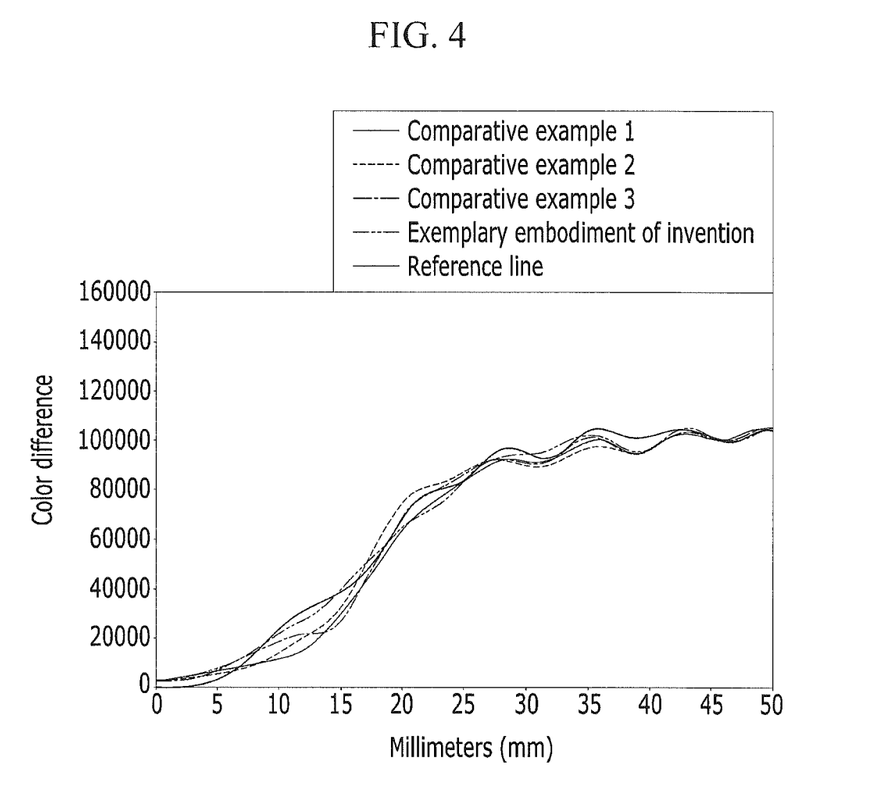
FIG. 4 is a graph showing a difference in light intensity between magenta and green according to positions in a liquid crystal display using the backlight assembly of FIG. 1 according to the invention together with Comparative Examples.
Figure 5:
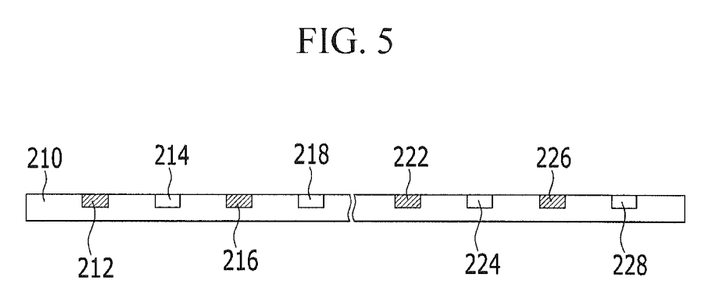
FIG. 5 is a top plan view showing an exemplary embodiment of a light source unit of a backlight assembly according to the invention.
Figure 6:
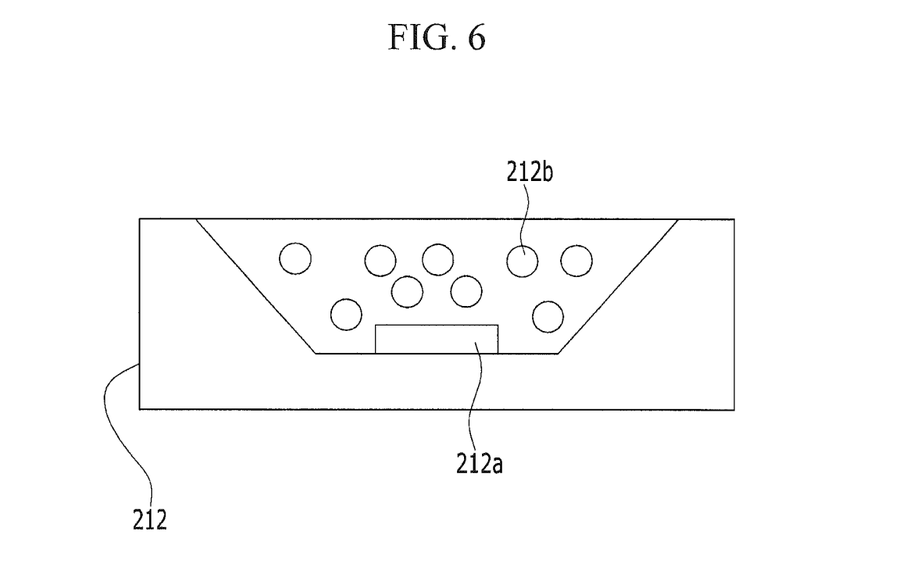
FIG. 6 is a cross-sectional view showing an exemplary embodiment of a first light emitting member of a backlight assembly according to the invention.

FIG. 1 is a top plan view showing an exemplary embodiment of a backlight assembly according to the invention, FIG. 2 is an enlarged top plan view of portion A shown in FIG. 1, FIG. 3 is a diagram showing a top plan view of a corner portion of a light guide plate of a backlight assembly according to the invention together with top plan views of corner portions of light guide plates of Comparative Examples, FIG. 4 is a graph showing a difference in light intensity between magenta and green according to positions in a liquid crystal display using the backlight assembly according to the invention together with the Comparative Examples, FIG. 5 is a top plan view showing an exemplary embodiment of a light source unit of a backlight assembly according to the invention, and FIG. 6 is a cross-sectional view showing an exemplary embodiment a first light emitting member of a backlight assembly according to the invention.

As shown in FIG. 1, a backlight assembly according to the invention includes a first light source unit 210 including a plurality of light emitting members, and a light guide plate 100 of which one side is adjacent to the first light source unit 210.

The plurality of light emitting members of the first light source unit 210 may be light emitting diodes ("LEDs"), and are spaced apart from each other and linearly aligned. The plurality of light emitting members include a first light emitting member 212 positioned at a first end of one edge of the first light source unit 210, and a second light emitting member 214 positioned at the same one edge of the first light source unit 210 and disposed adjacent to the first light emitting member 212.

The light guide plate 100 allows light emitted from the first light source unit 210 to reach an entire display panel (not shown) at uniform luminance. As shown in FIG. 1, in the case where the first light source unit 210 is along a lower side of the light guide plate 100, the light emitted from the first light source unit 210 is incident to the light guide plate 100, and the incident light is guided inside the light guide plate 100 and emitted to an upper surface of the light guide plate 100. The light emitted to the upper surface of the light guide plate 100 is uniformly distributed from a lower point to a mid-point of the light guide plate 100. Although not shown in FIG. 1, a liquid crystal panel is disposed on the light guide plate 100, such that the light emitted to the upper surface of the light guide plate 100 is incident to the liquid crystal panel, thereby displaying an image on a screen.

The light guide plate 100 includes a first groove 112 adjacent to one (e.g., first) end of the side of the light guide plate 100 adjacent to the first light source unit 210.

The first groove 112 faces the first light emitting member 212 and has an arc shape in the plan view starting at a point between the first light emitting member 212 and the second light emitting member 214. Therefore, the first groove 112 deepens gradually from the starting point toward a position where the first groove 112 faces the first light emitting member 212.

As shown in the drawings, the first groove 112 starts from a first edge of the light guide plate 100 at a point between the first light emitting member 212 and the second light emitting member 214, and is extended to a second edge adjacent to the first edge of the light guide plate 100 in a linear shape, but the invention is not limited thereto and the first groove 112 may not be extended to the second edge of the light guide plate 100. That is, the first groove 112 starts from the point between the first light emitting member 212 and the second light emitting member 214 and may extend only to the position where the first groove 112 faces the first light emitting member 212. Alternatively, the first groove 112 starts from the point between the first light emitting member 212 and the second light emitting member 214 and may extend only to a point spaced at a predetermined distance from the position where the first groove 112 faces the first light emitting member 212.

The light guide plate 100 may be divided into sections by drawing vertical lines on the basis of the points including the plurality of light emitting members. In the case, since a side surface of the light guide plate 100 serves as a mirror in a section between the outermost first light emitting member 212 and the second light emitting members 214, if the light guide plate 100 does not include the first groove 112, light emitted from the first light emitting member 212 has approximately twice the intensity of light emitted from the second light emitting member 214. As a result, irregularity by the color of the first light emitting member 212 is displayed in a corner portion (e.g., at the first end of the side) of the light guide plate 100.

In the invention, since the light guide plate 100 includes the first groove 112 at the position facing the first light emitting member 212, approximately 50% of the light emitted from the first light emitting member 212 is scattered and a remaining light of approximately 50% may be incident to the light guide plate 100. Therefore, when the light guide plate 100 is divided into the sections by drawing the vertical lines on the basis of the points where the plurality of light emitting members are formed, the light emitted from the first light emitting member 212 may have the light intensity similar to that of the light from the second light emitting member 214 in the section between the first light emitting member 212 and the second light emitting member 214. Consequently, the lights emitted from the first light emitting member 212 and the second light emitting member 214 and incident to the light guide plate 100 are mixed to display white light, and as a result, the color irregularity in the related art is not caused.

A distance between the second light emitting member 214 and the light guide plate 100 which is measured in a direction perpendicular to the second light emitting member 214 is represented by d1, and a distance between the first light emitting member 212 and the first groove 112 which is measured in a direction perpendicular to the first light emitting member 212 is represented by d2.

In this case, d2 is set so that the light intensity incident to the light guide plate 100 from the first light emitting member 212 is about 45% to about 55% of the light intensity incident to the light guide plate 100 from the second light emitting member 214. In an exemplary embodiment, d2 is set so that the light intensity incident to the light guide plate 100 from the first light emitting member 212 is about 50% of the light intensity incident to the light guide plate 100 from the second light emitting member 214.

In one exemplary embodiment, for instance, when d1 is between about 0.5 millimeter (mm) and about 0.7 mm, d2 may be between about 2 mm and about 4 mm. However, this is merely an example and when the size, the thickness, and the like of the light guide plate 100 are changed, values of d1 and d2 may be changed.

The starting point of the first groove 112 is positioned between the first light emitting member 212 and the second light emitting member 214. A distance between a point of the first light source unit 210 corresponding to the starting point the first groove 112 and the first light emitting member 212 is represented by d3 and a distance between the first light emitting member 212 and the second light emitting member 214 is represented by d4. In this case, d4 may be set to be larger than d3. The distance d4 is larger than d3 because when d3 is larger than d4, the first groove 112 extends to a point where the first groove 112 faces the second light emitting member 214 and influences the light intensity that is emitted from the second light emitting member 214 and incident to the light guide plate 100.

FIG. 3 is a diagram showing a top plan view of a corner portion of a light guide plate of a backlight assembly according to the invention together with top plan views of corner portions of light guide plates of Comparative Examples. The profiles are shown with reference to distance in mm from a corner of the light guide plate formed by intersecting imaginary lines extended from adjacent sides of the light guide plate. As shown in FIG. 3, top plan views of corner portions of light guide plates in Comparative Examples 1 to 3 are illustrated together with a top plan view of the corner portion of a light guide plate 100 in the exemplary embodiment of the invention.

Referring to FIG. 4, in the case of the exemplary embodiment of the invention and Comparative Example 1 to 3, a color difference between the first light emitting member 212 and the second light emitting member 214 at a point 10 mm inward from a light incidence unit of the light guide plate 100 is represented by a graph. A reference line represents the ideal case where the light intensity incident to the light guide plate 100 from the first light emitting member 212 is 50% of the light intensity incident to the light guide plate 100 from the second light emitting member 214. It is confirmed that the case of the exemplary embodiment of the invention is closer to the reference line than the cases of Comparative Examples 1 to 3.

That is, in the light guide plate 100 of the invention, when the first groove 112 has the arc shape where the first groove 112 starts at the point between the first light emitting member 212 and the second light emitting member 214 and deepens gradually from the starting point of the first groove 112 and toward the position where the first groove 112 faces the first light emitting member 212, a graph of the color difference is closest to the reference line.

The light guide plate 100 may further include a second groove 114 that is adjacent to the other (e.g., second opposing) end of the side of the light guide plate 100 adjacent to the first light source unit 210. The plurality of light emitting members may further include a n-th light emitting member 228 positioned at a second end opposite to the first end and at the one edge of the the first light source unit 210, and a n-1-th light emitting member 226 positioned adjacent to the n-th light emitting member 228. The second groove 114 faces the n-th light emitting member 228.

In this case, the first groove 112 and the second groove 114 may be symmetrical to each other. That is, the second groove 114 may have an arc shape in the plan view where the second groove 114 starts from a point between the n-1-th light emitting member 226 and the n-th light emitting member 228 and deepens gradually from the starting point of the second groove 114 toward a position where the second groove 114 faces the n-th light emitting member 212.

The backlight assembly according to the invention may further include a second light source unit 250 positioned adjacent to an upper side facing the lower side of the light guide plate 100. In this case, light emitted from the first light source unit 210 reaches a half surface of the light guide plate 100 and light emitted from the second light source unit 250 reaches the other half surface of the light guide plate 100.

The light guide plate 100 may further include a third groove 116 and a fourth groove 118 that at opposing ends of the side of the light guide plate 100 adjacent to the second light source unit 250. The third groove 116 and the fourth groove 118 may be symmetrical to the first groove 112 and the second groove 114, respectively.

Hereinafter, a layout of LEDs in the first light source unit 210 and the second light source unit 250 of the backlight assembly according to the invention will be described.

As shown in FIG. 5, the first light source unit 210 may include n light emitting members. Referring to FIG. 5, the n light emitting members are represented by a first light emitting member 212, a second light emitting member 214, a third light emitting member 216, and a fourth light emitting member 218 from a left edge of the first light source unit 210 and a n-th light emitting member 228, a n-1-th light emitting member 226, a n-2-th light emitting member 224, and a n-3-th light emitting member 222 from a right edge of the first light source unit 210, and light emitting members between the fourth light emitting member 218 and the n-3-th light emitting member 222 are not shown.

As the n light emitting members, magenta LEDs and green LEDs may be alternately positioned. That is, the first light emitting member 212, the third light emitting member 216, the n-1-th light emitting member 226, and the n-3-th light emitting member 222 may be the magenta LEDs, and the second light emitting member 214, the fourth light emitting member 218, the n-2-th light emitting member 224, and the n-th light emitting member 228 may be the green LEDs.

In this case, the light emitting members positioned at both left and right edges of the first light source unit 210 are the magenta LED 212 and the green LED 228, respectively.

The first light emitting member 212 including the magenta LED includes a blue LED chip 212a and red phosphors 212b, as shown in FIG. 6. The light emitted from the blue LED chip 212a passes through the red phosphor 212b, thereby displaying magenta light. Therefore, the lights emitted from the magenta LED and the green LED are mixed in the light guide plate 100, thereby displaying white light. In this case, since a lifespan of the magenta LED is similar to that of the green LED, a separate color controller is not needed, thereby reducing a cost.

Similarly as in the first light source unit 210, in the second light source unit 250, as the n LEDs, the magenta LEDs and the green LEDs may be alternately disposed and different colors of LEDs are disposed at both left and right edges thereof.

Hereinafter, another exemplary embodiment of a backlight assembly according to the invention will be described with reference to the accompanying drawings.

Figure 7:
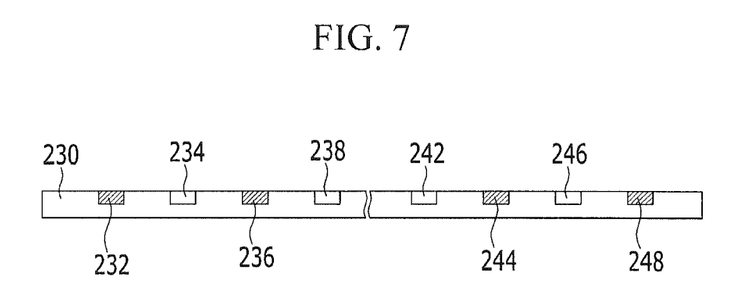
FIG. 7 is a top plan view showing another exemplary embodiment of a light source unit of a backlight assembly according to the invention.

The greatest difference from the exemplary embodiment in FIG. 1 and the example embodiment in FIG. 7 is that in the exemplary embodiment in FIG. 7, colors of light emitting members disposed at both ends of a light source unit are the same as each other. Hereinafter, this difference is described in detail.

FIG. 7 is a top plan view showing another exemplary embodiment of a light source unit of a backlight assembly according to the invention.

The backlight assembly of FIG. 7 is almost the same as the backlight assembly of FIG. 1, and therefore the duplicated description is omitted and only a different part is described hereinafter.

The backlight assembly of FIG. 7 is the same as the backlight assembly of FIG. 1 in that the backlight assembly of FIG. 7 includes a first light source unit 230 including a plurality of light emitting members, and a light guide plate (not shown) of which one side is adjacent to the first light source unit 230.

The first light source unit 230 may include n light emitting members. Referring to FIG. 7, the n light emitting members are represented by a first light emitting member 232, a second light emitting member 234, a third light emitting member 236, and a fourth light emitting member 238 from a left edge of the first light source unit 230 and a n-th light emitting member 248, a n-1-th light emitting member 246, a n-2-th light emitting member 244, and a n-3-th light emitting member 242 from a right edge of the first light source unit 230, and light emitting members between the fourth light emitting member 238 and the n-3-th light emitting member 242 are not shown.

As the n light emitting members, magenta LEDs and green LEDs may be alternately positioned. That is, the first light emitting member 232, the third light emitting member 236, the n-th light emitting member 248, and the n-2-th light emitting member 244 may be the magenta LEDs, and the second light emitting member 234, the fourth light emitting member 238, the n-1-th light emitting member 246, and the n-3-th light emitting member 242 may be the green LEDs.

In this case, both of the light emitting members positioned at the both edges of the first light source unit 230 are the magenta LEDs.

In the exemplary embodiment in FIG. 1, the magenta LEDs are disposed at the same number as the green LEDs, such that the light emitting members positioned at both the left and right edges of the first light source unit (210 shown in FIG. 5) have different colors. The green LED greatly influences luminance. Since the magenta LED is disposed at the left edge of the first light source unit (210 shown in FIG. 5), luminance is not remarkably deteriorated at the left edge of the light guide plate (100 shown in FIG. 1), but since the green LED is disposed at the right edge of the first light source unit (210 shown in FIG. 5), luminance is relatively remarkably deteriorated at the right edge of the light guide plate (100 shown in FIG. 1). As a result, luminance imbalance between the left and right edges of the light guide plate (100 shown in FIG. 1) is caused.

On the other hand, since in the exemplary embodiment in FIG. 7, one more magenta LED is disposed than the green LED, the light emitting members positioned at both the left and right edges of the first light source unit 230 have the same color. Therefore, the luminance balance between the left and right edges of the light guide plate (not shown) is achieved.

The magenta LEDs are disposed at both the left and right edges of the first light source unit 230 of the backlight assembly according to the exemplary embodiment in FIG. 7, but the invention is not limited thereto, and the green LEDs may be disposed at both edges of the first light source unit 230. However, in this case, the luminance balance between the left and right edges of the light guide plate can be achieved, but the green LED has more influence on the luminance than the magenta LED, and as a result, the overall reduction in luminance grows.

According to a backlight assembly employing the light source of the exemplary embodiment in FIG. 7, it is possible to prevent the luminance imbalance between the left and right sides of the light guide plate and minimize the overall reduction in the luminance by disposing the magenta LEDs at both the left and right edges of the first light source unit 230.

Hereinafter, another exemplary embodiment of a backlight assembly according to the invention will be described with reference to the accompanying drawings.

Figure 8:
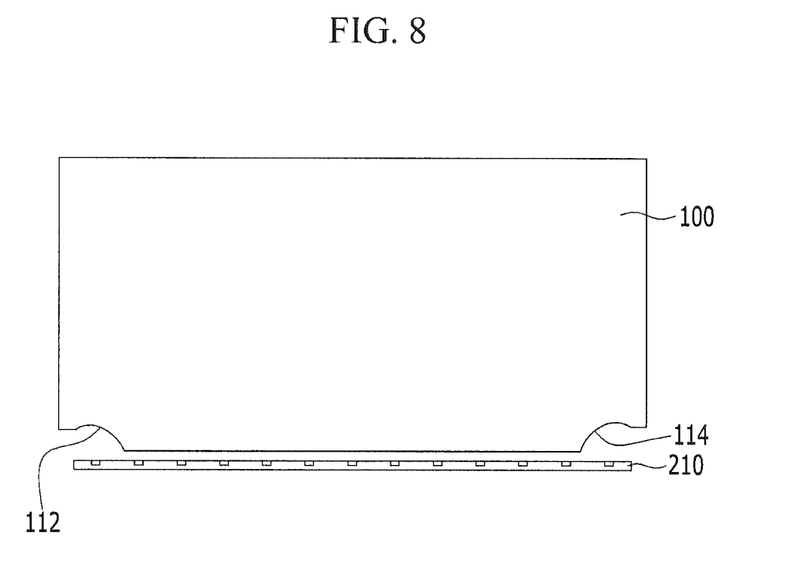
FIG. 8 is a top plan view showing another exemplary embodiment of a backlight assembly according to the invention.

The greatest difference from the exemplary embodiment in FIG. 1 is that in the exemplary embodiment in FIG. 8, a light source unit is at only one side of a light guide plate. Hereinafter, this difference is described in detail.

FIG. 8 is a top plan view showing another exemplary embodiment of a backlight assembly according to the invention.

The backlight assembly according to the exemplary embodiment in FIG. 8 is almost the same as the backlight assembly according to the exemplary embodiment in FIG. 1, and therefore the duplicated description is omitted and only a different part is described hereinafter.

The backlight assembly according to the exemplary embodiment in FIG. 8 is the same as the backlight assembly according to the exemplary embodiment in FIG. 1 in that the backlight assembly includes a first light source unit 210 including a plurality of light emitting members, and a light guide plate 100 of which only one side is adjacent to the first light source unit 210.

The light guide plate 100 includes a first groove 112 and a second groove 114 that are adjacent to left and right edges of the side of the light guide plate 100 adjacent to the first light source unit 210.

In the backlight assembly according to the exemplary embodiment in FIG. 8, the first light source unit 210 is disposed to be adjacent to the only one (e.g., lower) side of the light guide plate 100 and no light source is at the other (e.g., upper) side facing the one side. Therefore, the first groove 112 and the second groove 114 are only at the one lower side of the light guide plate 100 adjacent to the first light source unit 210 and no groove is at the other side facing the one lower side.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight assembly, comprising:
   a first light source unit including first through n-th light emitting members; and
   a light guide plate including:
      a continuously linear first side adjacent to the first light source unit,
      a first groove recessed from the first side and adjacent to a first end of the first side, and
      a second groove recessed from the first side and adjacent to a second end opposite to the first end of the first side,
   wherein
   the first side is continuously linear between the first and second grooves,
   the first through n-th light emitting members include:
      the first light emitting member at a first end of the first light source unit, and facing the first groove;
      the n-th light emitting member at a second end opposite to the first end of the first light source unit; and
      a second light emitting member adjacent to the first light emitting member and a n-1-th light emitting member adjacent to the n-th light emitting member, each facing the continuously linear first side of the light guide plate, and
   the first through n-th light emitting members are spaced apart from each other and linearly aligned such that surfaces thereof facing the light guide plate are disposed on a same line, wherein the first groove and the second groove have an arc shape in a plan view, and in a direction perpendicular to the first side, a terminating end of the arc shape is at a distance from the first side, and in a direction perpendicular to the first side, a maximum distance between the arc shape and the first side is greater than the distance between the terminating end of the arc.

2. The backlight assembly of claim 1, wherein:
   a starting point of the first groove is between the first light emitting member and the second light emitting member.

3. The backlight assembly of claim 2, wherein:
   the first groove has a shape in which a distance from the first light source unit gradually increases from the starting point of the first groove to a position where the first groove faces the first light emitting member.

4. The backlight assembly of claim 3, wherein:
   a distance from the first light emitting member to the first groove, which is measured perpendicular to the first light emitting member, is set so that the light intensity incident to the light guide plate from the first light emitting member is about 45% to about 55% of the light intensity incident to the light guide plate from the second light emitting member.

5. The backlight assembly of claim 4, wherein:
   when a distance from the second light emitting member to the light guide plate, which is measured perpendicular to the second light emitting member, is between about 0.5 millimeter and about 0.7 millimeter, and the distance from the first light emitting member to the first groove, which is measured perpendicular to the first light emitting member, is between about 2 millimeters and about 4 millimeters.

6. The backlight assembly of claim 1, wherein the second groove faces the n-th light emitting member.

7. The backlight assembly of claim 6, further comprising:
a second light source unit adjacent to a second side facing the first side of the light guide plate,
wherein the light guide plate further includes a third groove and a fourth groove adjacent to a first end of the second side, and a second end opposite to the first end of the second side, respectively.

8. The backlight assembly of claim 6, wherein:
the n light emitting members further include magenta light emitting diodes and green light emitting diodes which alternate with each other across an entire of the first side of the light guide plate,
the first light emitting member is a magenta light emitting diode, and
the n-th light emitting member is a green light emitting diode.

9. The backlight assembly of claim 6, wherein:
the n light emitting members further include magenta light emitting diodes and green light emitting diodes which alternate with each other across an entire of the first side of the light guide plate, and
the first light emitting member and the n-th light emitting member are a magenta light emitting diode.

10. The backlight assembly of claim 9, wherein:
the magenta light emitting diode includes
a blue light emitting diode chip; and
a red phosphor.

11. The light guide plate of claim 1, wherein a distance between the first light emitting member and the light guide plate is greater than a distance between the second light emitting member and the light guide plate.

12. A light guide plate, comprising:
a single, continuously linear first side;
a first groove recessed starting from the first side and adjacent to a first end of the first side of the light guide plate; and
a second groove recessed starting from the first side and adjacent to a second end opposite to the first end of the first side of the light guide plate,
wherein
the single first side is continuously linear between the first and second grooves,
the first groove and the second groove have an arc shape in a plan view, and
in a direction perpendicular to the first side,
a terminating end of the ar shape is at a distance from the first side, and in a direction perpendicular to the first side,
a maximum distance between the arc shape and the first side is greater than the distance between the terminating end of the arc shape and the first side.

13. The light guide plate of claim 12, wherein:
depths of the first groove and the second groove are between about 2 millimeters and about 4 millimeters.

14. The light guide plate of claim 13, further comprising:
a third groove adjacent to a first end of a second side which faces the first side of the light guide plate, and
a fourth groove adjacent to a second end opposite to the first end of the second side.

15. The light guide plate of claim 12, further comprising first and second edges intersecting a virtual line extended from the first and second ends of the first side, respectively,
wherein the first and second groove arch shapes terminate at positions separated from the first and second edges, in a direction perpendicular to the first and second edges, respectively.

* * * * *